United States Patent
Wang et al.

(10) Patent No.: US 8,370,431 B1
(45) Date of Patent: Feb. 5, 2013

(54) SECURE DESKTOP FOR A NETWORK MEETING

(75) Inventors: Wanchun Wang, Fremont, CA (US); Hao Xu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1427 days.

(21) Appl. No.: 11/280,511

(22) Filed: Nov. 16, 2005

(51) Int. Cl.
   *G06F 15/16* (2006.01)
(52) U.S. Cl. ......... 709/204; 709/203; 709/205; 709/206
(58) Field of Classification Search ................... 707/220; 709/203; 715/778; 726/4
   See application file for complete search history.

(56) References Cited

U.S. PATENT DOCUMENTS

| | | | | |
|---|---|---|---|---|
| 5,930,473 | A * | 7/1999 | Teng et al. | 709/204 |
| 6,061,795 | A * | 5/2000 | Dircks et al. | 726/4 |
| 6,343,313 | B1 * | 1/2002 | Salesky et al. | 709/204 |
| 7,197,535 | B2 * | 3/2007 | Salesky et al. | 709/204 |
| 7,266,779 | B2 * | 9/2007 | Baek et al. | 715/778 |
| 7,310,675 | B2 * | 12/2007 | Salesky et al. | 709/227 |
| 7,369,515 | B2 * | 5/2008 | Salesky et al. | 370/260 |
| 2003/0179240 | A1 * | 9/2003 | Gest | 345/779 |
| 2004/0181579 | A1 * | 9/2004 | Huck et al. | 709/205 |
| 2005/0080850 | A1 * | 4/2005 | Salesky et al. | 709/204 |
| 2005/0120082 | A1 * | 6/2005 | Hesselink et al. | 709/203 |
| 2006/0064440 | A1 * | 3/2006 | Perry | 707/200 |
| 2006/0161623 | A1 * | 7/2006 | Montgomery et al. | 709/204 |
| 2006/0167996 | A1 * | 7/2006 | Orsolini et al. | 709/204 |
| 2007/0094413 | A1 * | 4/2007 | Salazar et al. | 709/248 |
| 2007/0101148 | A1 * | 5/2007 | Schutz et al. | 713/182 |
| 2008/0183817 | A1 * | 7/2008 | Baek et al. | 709/204 |
| 2010/0024036 | A1 * | 1/2010 | Morozov et al. | 726/26 |

OTHER PUBLICATIONS

Virtual Desktop—Wikipedia.*

* cited by examiner

*Primary Examiner* — Brian P Whipple
*Assistant Examiner* — Keyvan Emdadi
(74) *Attorney, Agent, or Firm* — Shumaker & Sieffert, P.A.

(57) ABSTRACT

A network meeting application for providing network meetings, such as web conference meetings, runs on a presenter device. In response to a request for a network meeting from an attendee device, the presenter device creates a secure desktop separate from a working desktop. The presenter may use the secure desktop to share documents, presentations, or other applications with the attendee device. The attendee device is blocked from accessing the working desktop of the presenter device. A presenter using the presenter device may switch between the working desktop and the secure desktop. Security policies, downloaded to the presenter device from a server, determine the applications the attendee may run on the secure desktop. The secure desktop thereby protects the integrity of the presenter's working desktop during a web conference meeting, while allowing documents, presentations, or other applications to be shared with attendees via the secure desktop.

33 Claims, 7 Drawing Sheets

FIG. 7

# SECURE DESKTOP FOR A NETWORK MEETING

TECHNICAL FIELD

Principles of the invention relate to network meetings and, more particularly, to securely sharing computer applications and computer desktops during network meetings.

BACKGROUND

Network conferencing software allows two or more remote parties to conduct meetings over a public network such as the Internet. For example, remote parties may use web conferencing for services such as customer support, troubleshooting, training, interviewing, or sales meetings. A web conference meeting may consist of one or more presenters and one or more attendees, each of which may be located at a geographically remote site. Web conference software allows the presenters and attendees to share documents, presentations or other applications between their computers, and may allow an attendee to view or control a presenter's computer desktop.

Conventional web conference software operates on the presenter's working desktop. When an attendee remotely controls the presenter's working desktop, the attendee may open files and run applications from the working desktop. As a result, attendees may have access to sensitive information on the presenter's working desktop, such as emails or address books. Consequently, when using web conferencing software, presenters may feel as though sensitive information and working desktop integrity are at risk. Some web conference programs attempt to solve this problem by limiting the applications that a remotely controlling attendee may launch. However, sensitive information may be inadvertently shared with attendees. Further, actions taken by an attendee remotely controlling the presenter's desktop may directly impact the presenter's working desktop.

SUMMARY

In general, principles of the invention are directed to techniques for maintaining computer desktop security and, more specifically, providing a dedicated, secure desktop isolated from a working desktop that provides a secure environment for network meetings, e.g., web conference meetings. In particular, a network meeting application executes on a presenter device. In response to a request for a network meeting from an attendee device, the presenter device creates a secure desktop, through which documents, presentations, or other applications may be shared with the attendee device. The attendee device is blocked from accessing the working desktop of the presenter device. A presenter using the presenter device may switch between the working desktop and the secure desktop using a switch icon. In contrast, the attendee may view only the secure desktop, and not the working desktop. The attendee may remotely control the secure desktop of the presenter device from the attendee device.

Security policies, downloaded to the presenter device from a server, determine what types of applications the attendee may run on the secure desktop. If the attendee attempts to run an application that is restricted by the security policies, the network meeting application blocks the application from running on the secure desktop.

In one embodiment, a method comprises receiving a request for a network meeting at a presenter device having a working desktop and creating a secure desktop on the presenter device in response to the request.

In another embodiment, a device comprises a network meeting application executing within a working desktop, wherein the network meeting application receives a request for a network meeting. The device further comprises a secure desktop created by the network meeting application in response to the request.

In another embodiment, a system comprises a presenter device associated with a virtual private network (VPN) server, wherein a network meeting application executes within a working desktop of the presenter device. The system further comprises one or more attendee devices associated with the VPN server. At least one of the attendee devices requests a network meeting from the presenter device. In response, the presenter device creates a secure desktop using the network meeting application in response to the request.

In another embodiment, a computer-readable medium comprises instructions for causing a device to receive a request for a network meeting at a presenter device having a working desktop and create a secure desktop on the presenter device in response to the request.

The invention may provide on or more advantages. For example, the separate secure desktop provides an isolated environment for a web conference meeting. The secure desktop thereby protects the integrity of the presenter's working desktop, while allowing documents, presentations, or other applications to be shared with attendees via the secure desktop. In addition, the security policies may be set to prevent the secure desktop from running graphics-heavy applications, such as wallpaper or media players. In this manner, the amount of data sent over a virtual private network during a web conference may be greatly reduced, improving bandwidth and throughput.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
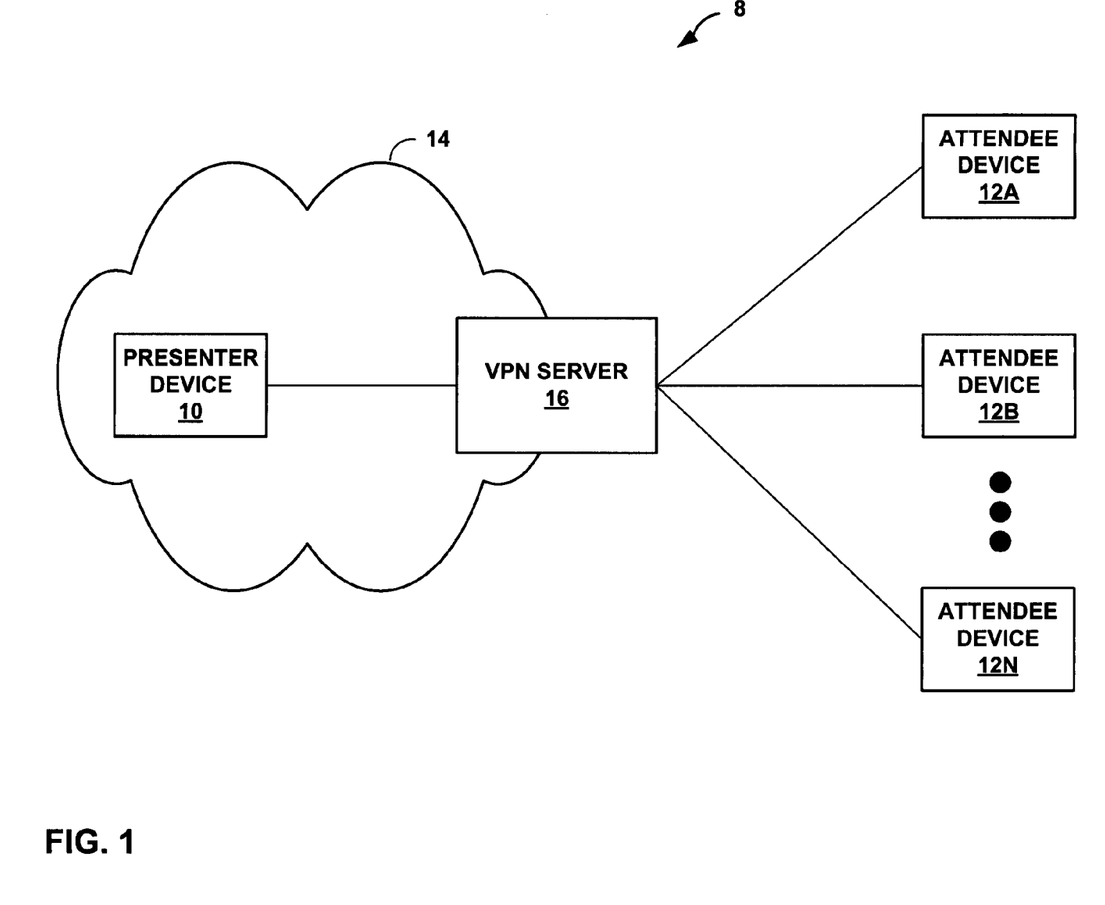
FIG. 1 is a block diagram illustrating an example system in which a presenter device presents a network meeting attended by a plurality of attendees.

FIG. 1 is a block diagram illustrating an example system 8 in which a presenter device 10 presents a network meeting attended by a plurality of attendee devices 12A-12N (collectively, "attendees 12"). In this example, presenter device 10 resides in network 14. A virtual private network (VPN) server 16 located at the edge of network 14 provides VPN services to network 14. VPN server 16 may be a secure socket layer (SSL) VPN server that provides secure tunnels for sharing data over a public network, such as the Internet.

In the example of FIG. 1, a presenter using presenter device 10 and attendees using attendee devices 12 may engage in a network meeting, such as a web conference meeting. The web conference meeting may be, for example, for customer support, troubleshooting, training, interviewing, or a sales meeting. A network meeting application may be installed on attendee devices 12 and presenter device 10. A presenter may use the network meeting application to share documents, presentations, or other applications from presenter device 10 to attendee devices 12. Attendees operating attendee devices 12 may have access via the network meeting application to the shared applications running on presenter device 10.

In accordance with the principles of the invention, in response to a request for a web conference meeting, the network meeting application provides presenter device 10 with a secure desktop separate from a working desktop of presenter device 10. The working desktop is the presenter's main "desktop," which is a software process that provides a user interface for launching and controlling the presenter's usual applications, such as email applications, word processing applications, media player applications, and other applications. The secure desktop is a separate desktop on presenter device 10 created in response to a web conference request. The secure desktop may be shared with attendee devices 12 and provides a platform for demonstration and sharing of certain authorized software applications, files or other resources, while the presenter device's working desktop is not shared and remains safe.

The secure desktop may be limited to running only certain applications; for example, the secure desktop may contain only the presentation applications to be shared with attendee devices 12. The types of applications that may be run or actions that may be taken on the secure desktop are controlled by security policies, which may be set by an administrator.

In one embodiment, the security policies may be contained on VPN server 16, and may be downloaded by presenter device 10 from VPN server 16. In the case where an attendee remotely controls the secure desktop, the attendee may only be able to run certain applications on the secure desktop, and the attendee may be prevented from taking certain actions on the secure desktop. For example, the attendee may not be allowed to run the Task Manager application, or may not be allowed to shut down the secure desktop.

Although the attendees are only able to view the secure desktop, the presenter may seamlessly switch back and forth between the working desktop and the secure desktop on presenter device 10 using an icon provided on the working desktop and secure desktop. In this manner, the presenter may choose which desktop to view at a given time. In contrast, attendees sharing the secure desktop of presenter device 10 via attendee devices 12 may not switch to the working desktop. Rather, attendees may only view the secure desktop. In this manner, the attendees are prevented from opening files or running applications from the working desktop, and may not have access to sensitive information on the presenter's working desktop, such as emails or address books.

Any changes made to documents, presentations, or other applications running on the secure desktop are made only to the secure desktop. No changes are made to these applications in the working desktop. Upon exiting the secure desktop, the presenter may choose to discard the changes made to the secure desktop applications, or may choose to save the changes to the working desktop.

Figure 2:
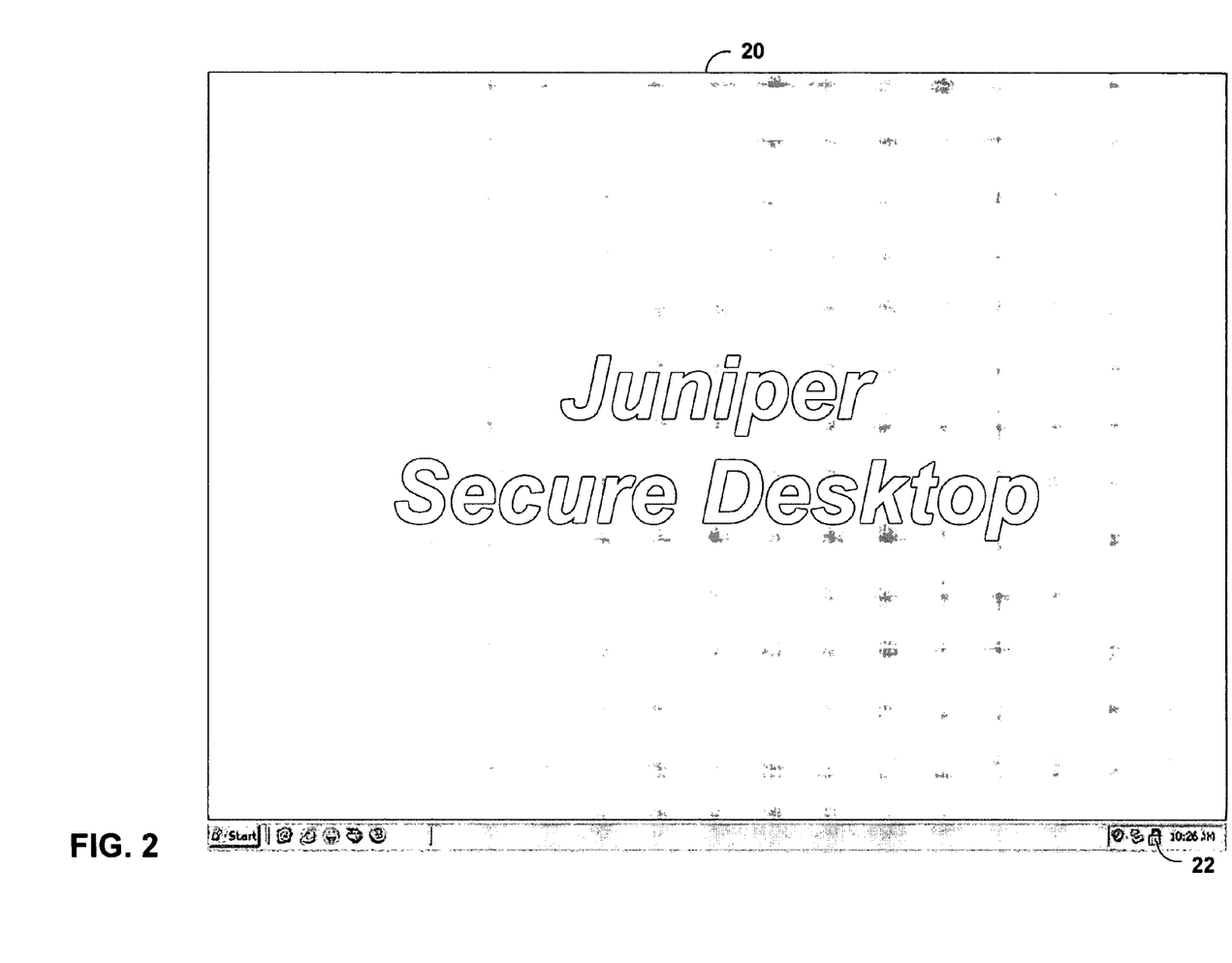
FIG. 2 is an exemplary screen illustration depicting an example secure desktop as viewed on a presenter device.

FIG. 2 is an exemplary screen illustration depicting an example secure desktop 20 as viewed on presenter device 10 of FIG. 1. As illustrated in FIG. 2, the secure desktop is a separate desktop distinct from the presenter's working desktop. The secure desktop may have plain wallpaper or may have no wallpaper, to reduce the amount of data to be transferred over the VPN tunnel to the attendee devices 12. Providing the secure desktop with different wallpaper from the working desktop may help the presenter quickly determine which desktop is being viewed on presenter device 10.

The secure desktop 20 may contain a switch icon 22 that the presenter may click with a mouse to switch between the secure desktop 20 and a working desktop. The secure desktop 20 may be shared with attendees via web conferencing software. In this manner, attendees may view the secure desktop 20 on remote attendee devices 12. The presenter may share documents, presentations, or other applications with the attendees from the secure desktop 20. The attendees may remotely operate secure desktop 20 from the attendee devices 12.

Figure 3:
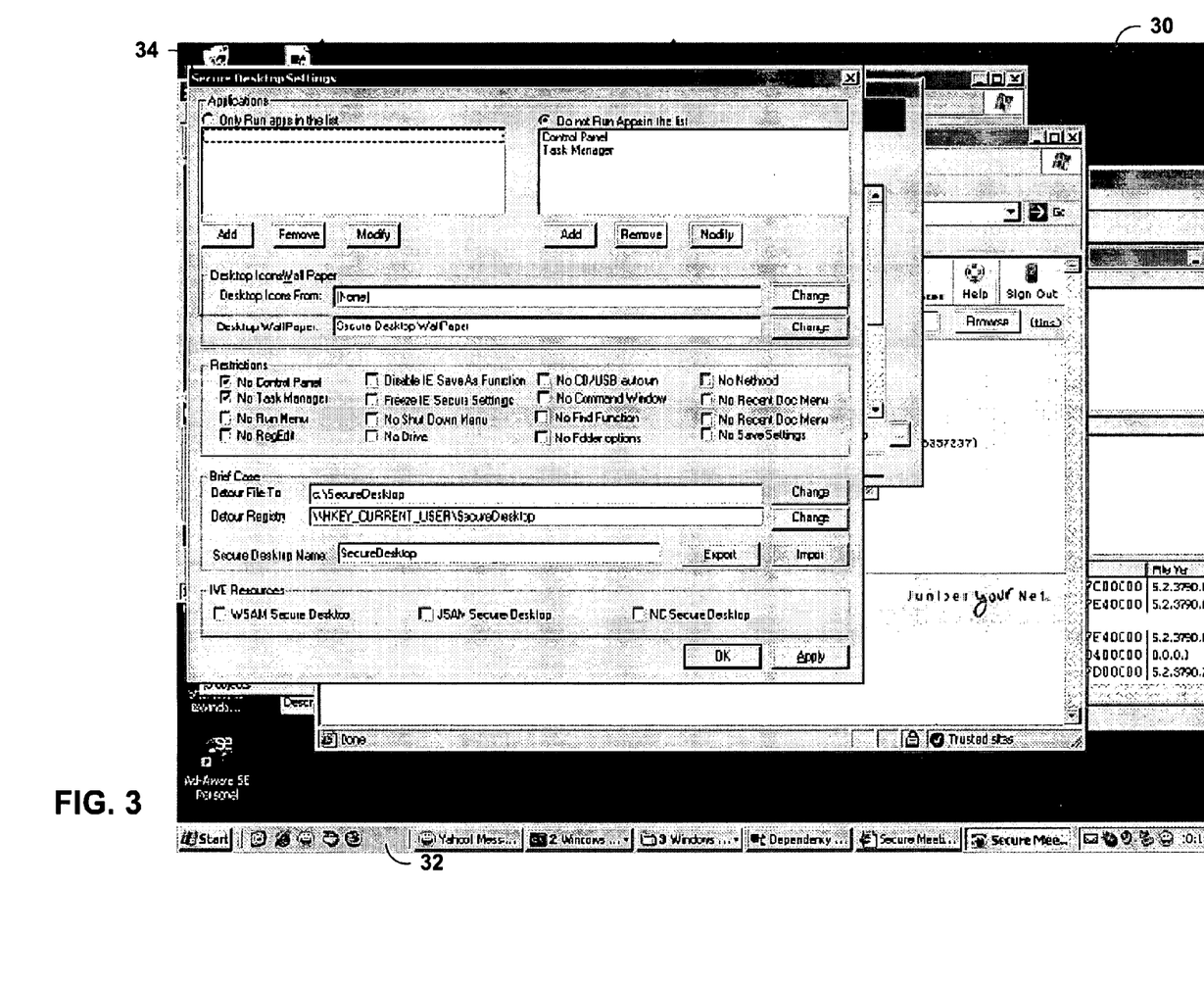
FIG. 3 is an exemplary screen illustration depicting an example secure desktop software page as viewed on a presenter device.

FIG. 3 is an exemplary screen illustration depicting an example working desktop 30 of presenter device 10 (FIG. 1). Working desktop 30 may be visible to a presenter operating presenter device 10. However, working desktop 30 is not visible to an attendee of a web conference meeting.

As can be seen from taskbar 32, a number of applications may be running on the working desktop. In the example of FIG. 3, a network meeting application 34 is running on working desktop 30. In accordance with the principles of the invention, network meeting application 34 may provide a secure desktop settings page that allows an administrator, or the presenter, to set security policies for the secure desktop. In setting the security policies, the administrator may determine what type of applications may be run on the secure desktop, and may decide how the secure desktop will look by setting wallpaper and desktop icons. The administrator may also determine restricted actions that may not be taken from the secure desktop, and determine a location to which file and registry calls are detoured for the secure desktop.

For example, the administrator may create a list of applications that may be run on the secure desktop. Alternatively, or in addition, the administrator may create a list of applications that are specifically prevented from executing on the secure desktop. In the example of FIG. 3, security policies are currently set to prevent the Control Panel and Task Manager applications from running on the secure desktop. In this manner, the administrator may set up the secure desktop such that it provides a separate desktop isolated from the working desktop. The administrator may configure the secure desktop such that graphics-heavy applications, such as media player applications or wallpaper applications, are prevented from running on the secure desktop. Thus, the administrator may reduce the amount of traffic sent over the VPN tunnel during a web conference meeting.

Figure 4:
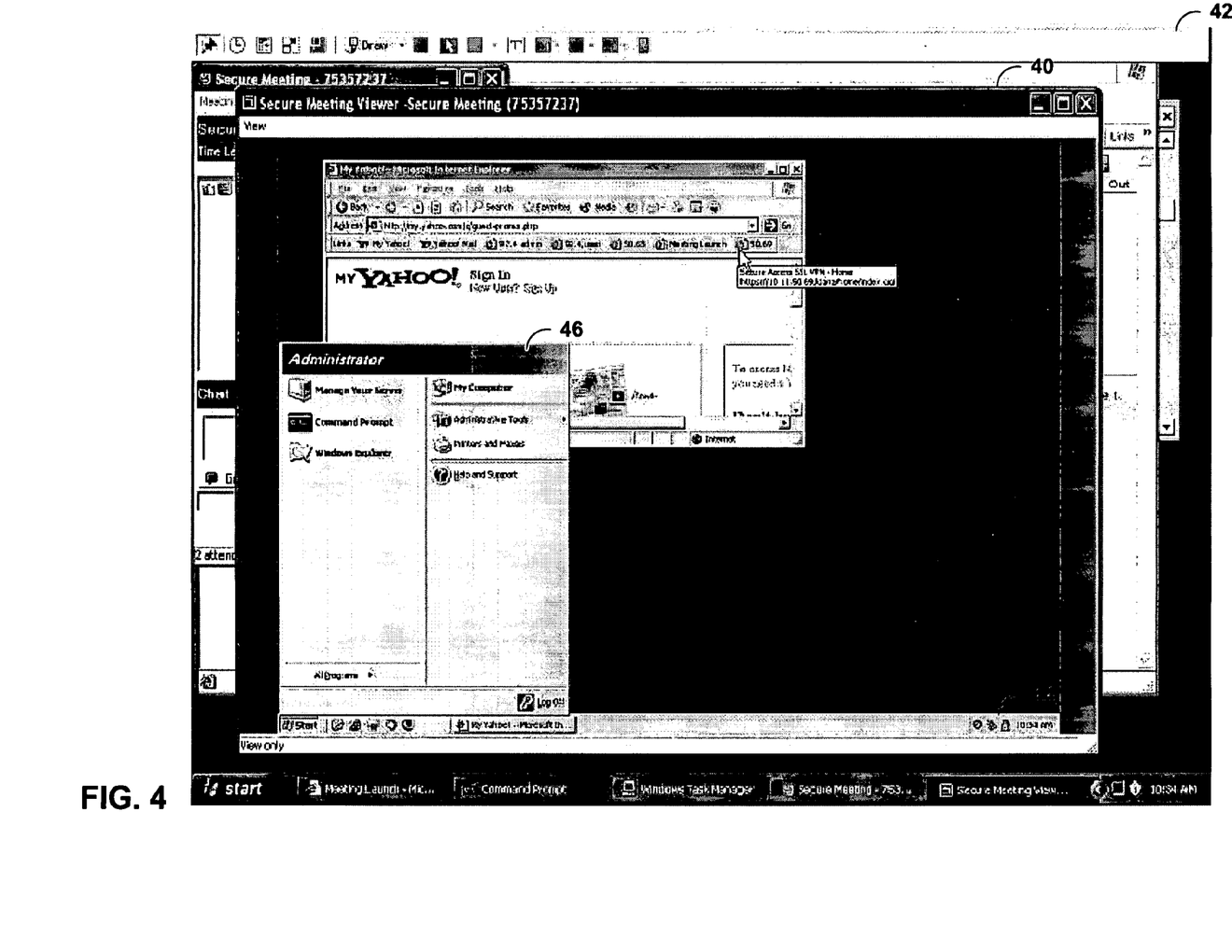
FIG. 4 is an exemplary screen illustration depicting an example secure desktop meeting viewer page of a secure desktop as viewed on a presenter device.

FIG. 4 is an exemplary screen illustration depicting an example secure desktop meeting viewer page of a secure desktop 40 as viewed on presenter device 10 (FIG. 1). The screen illustration shows the secure desktop 40 overlaid on the working desktop 42, as viewed by the presenter. The presenter may switch between secure desktop 40 and working desktop 42 using switch icon 44.

When engaged in a web conference meeting with presenter device 10, attendees see only secure desktop 40 on their attendee devices 12. The wallpaper and icons of secure desktop 40 may be controlled by security policies set by an administrator, as described above with respect to FIG. 3. The secure desktop looks different from the working desktop, thus providing the presenter with a visual indication of which desktop he or she is presently viewing.

The presenter may use the secure desktop to share documents, presentations, or other applications with the attendees. Attendees may be allowed to remotely control the secure desktop 40 of presenter device 10, using attendee devices 12. As shown in FIG. 4, the start menu 46 provides a limited amount of options to a remotely controlling attendee. These options are controlled by the security policies. Due to the security policies, an attendee may be prevented from launching certain applications or taking certain actions within secure desktop 40.

Figure 5:
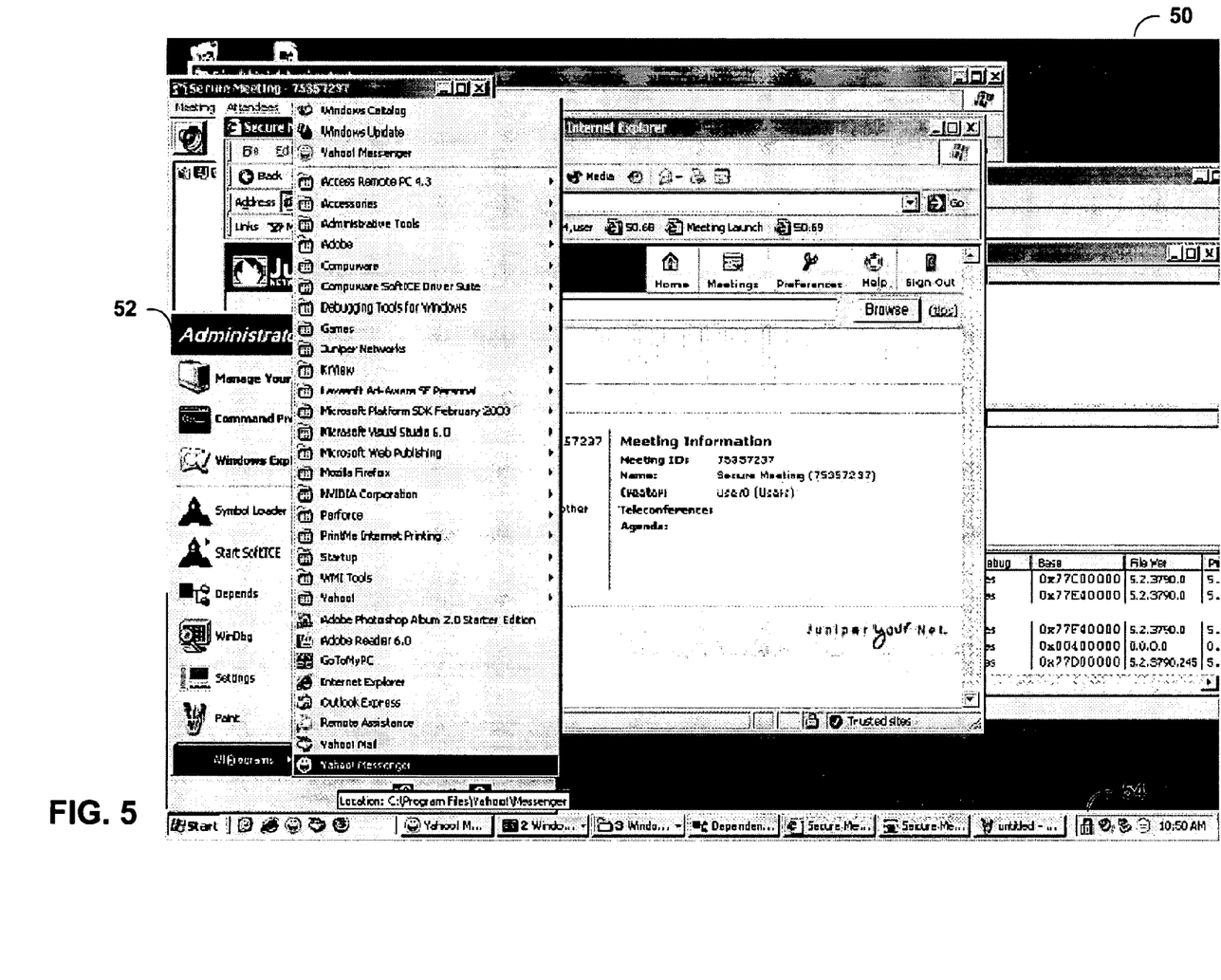
FIG. 5 is an exemplary screen illustration depicting an example working desktop as viewed on a presenter device.

FIG. 5 is an exemplary screen illustration depicting an example working desktop 50 as viewed on presenter device 10 (FIG. 1). The presenter uses the working desktop for running a number of applications. As can be seen from FIGS. 4 and 5, start menu 52 of FIG. 5 provides a wider range of applications for the presenter than are available on the secure desktop start menu 46 of FIG. 4. The working desktop may not be accessed by attendee devices 12 during a web conference meeting with presenter device 10. Similarly, an attendee that is remotely controlling the secure desktop of presenter device 10 does not have access to the applications shown on working desktop 50. The presenter may use switch icon 54 to switch between working desktop 50 and the secure desktop shown in FIG. 4.

Figure 6:
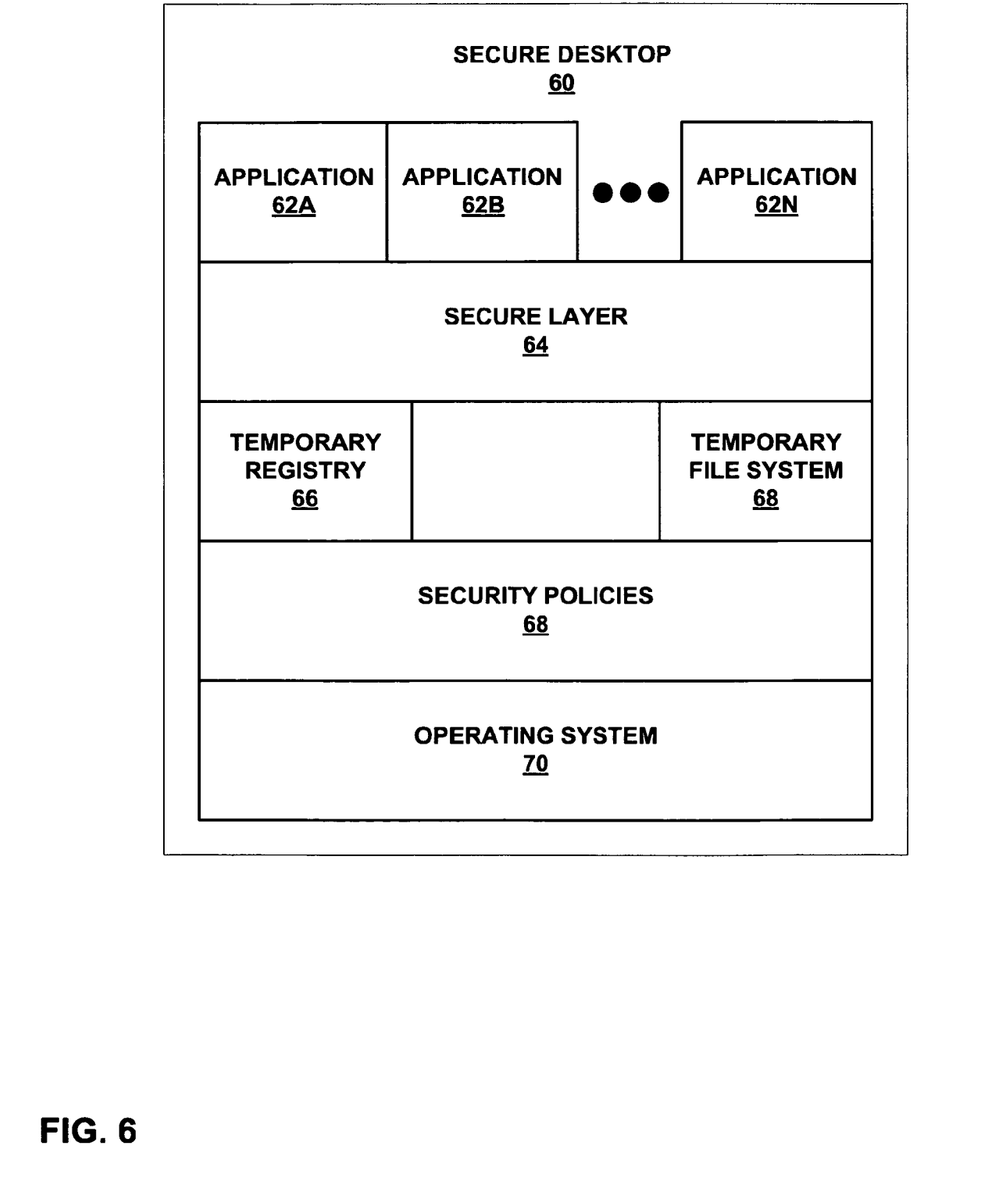
FIG. 6 is a block diagram illustrating exemplary architecture of a secure desktop.

FIG. 6 is a block diagram illustrating exemplary architecture of a secure desktop 60 that is created on a presenter device 10 in response to a request for a network meeting, such as a web conference meeting. Secure desktop 60 presents a number of applications 62A-62N (collectively, applications 62) to a plurality of attendees of the web conference meeting. Applications 62 may be web browsers, documents, presentations, or other applications that the presenter wants to share with the attendees. The types of applications that are permitted to run on secure desktop 60 may be defined by security policies 68. Security policies 68 may be set by an administrator, and may be downloaded to presenter device 10 from a VPN server such as VPN server 16 of FIG. 1.

In response to a request for a network meeting, a network meeting application creates secure desktop 60. As one example, for machines executing the Windows™ operating system for Microsoft Corporation, the network meeting application may utilize Windows™ NT Desktop Management APIs, which allows different desktops to be created within a single computing device such as Microsoft Windows Desktop Objects. Other tools may be used on other operating systems and computing platforms to create a separate desktop or other process for launching and controlling applications.

After creating the secure desktop, e.g., via Windows™ NT Desktop Management APIs, the network meeting application launches a sharing thread within the secure desktop. The sharing thread applies the security policies received from the network meeting application to the secure desktop.

Secure desktop 60 includes a secure layer 64 that intercepts calls from applications 62 to operating system 70. Upon intercepting a call, the secure layer 64 checks the operating system call against security policies 68 to determine whether security policies 68 permit the operating system call. For example, the operating system call may contain instructions to run an application such as Task Manager. If security policies 68 restrict Task Manager from running within secure desktop 60, secure layer 64 blocks the operating system call to operating system 70.

Secure layer 64 also redirects calls from a registry or file system of presenter device 10 to temporary registry 66 or temporary file system 68, respectively. Temporary registry 66 and temporary file system 68 mimic the actual registry and file system of the presenter device without detection by applications 62. Thus, any access or change to the registry or files system within the secure desktop are localized within the secure desktop process space, and does not affect the working desktop or the presenter device generally. In other words, there is no "footprint" on the working desktop of actions taken in the secure desktop.

When the presenter exits the secure desktop, the presenter may choose to either save any changes made in the secure desktop to the working desktop, or delete the changes by deleting the roots of temporary registry 66 and temporary file system 68. Secure layer 64 thus performs two main functions when intercepting operating system calls: first, checking the calls against security policies 68 to determine whether the calls are allowed; and second, redirecting allowed calls to the temporary registry 66 and temporary file system 68, so that the actual registry and file system of the presenters device remain untouched by actions taken in secure desktop 60.

Figure 7:
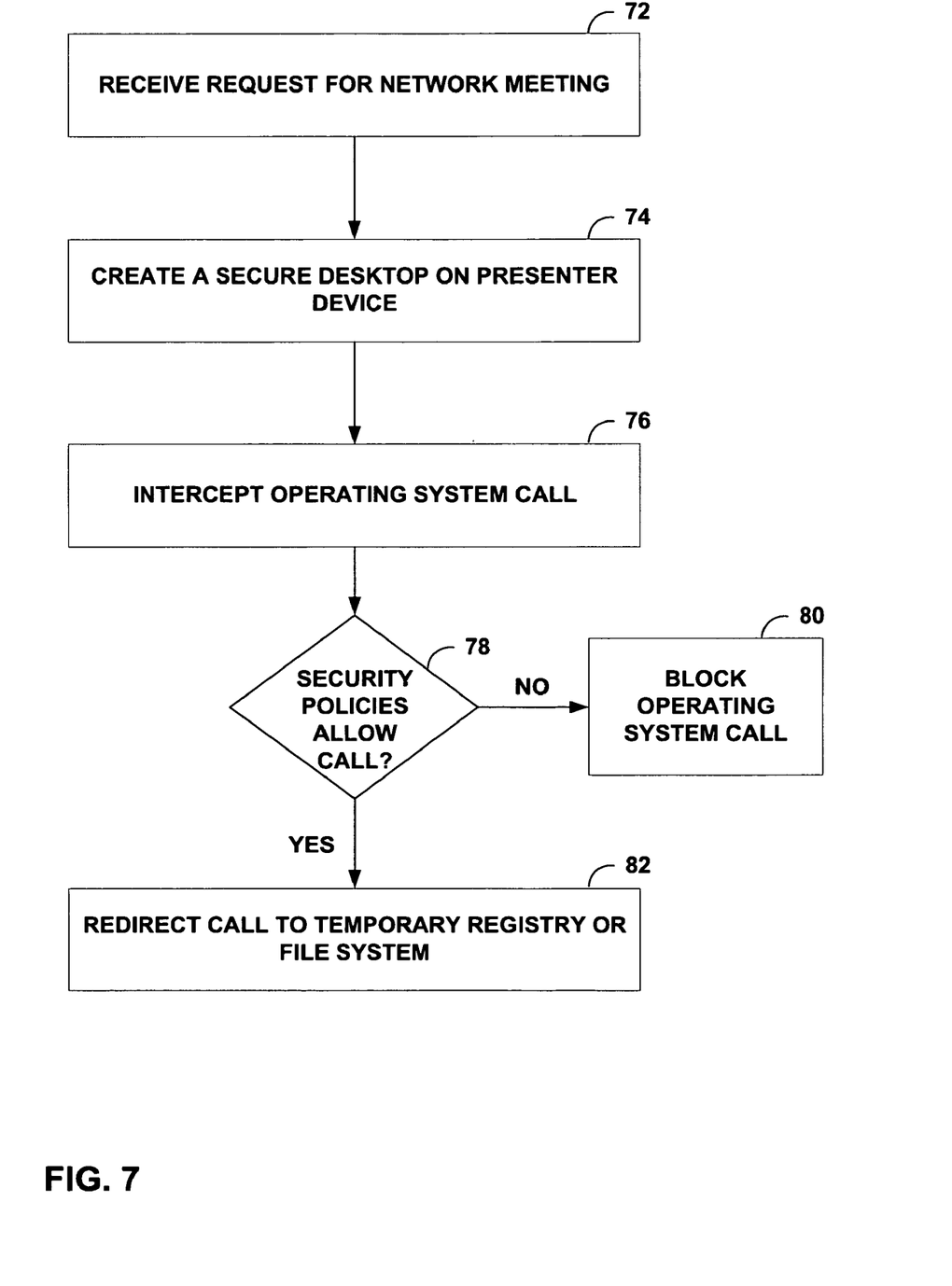
FIG. 7 is a flowchart illustrating example operation of a network meeting application in creating a secure desktop in accordance with the principles of the invention.

FIG. 7 is a flowchart illustrating example operation of a network meeting application in creation and utilization of a secure desktop in accordance with the principles of the invention. Presenter device 10 receives a request from an attendee device 12 for a network meeting (72). The network meeting may be a web conference meeting such as a customer service, troubleshooting, sales, training, interviewing, or other type of meeting.

In response to the request, the network meeting application creates a secure desktop on presenter device 10 (74). The secure desktop is isolated from the presenter device's working desktop. Security policies downloaded at presenter device 10 from a VPN server 16 may be used to create the secure desktop. For example, the security policies may determine visual aspects of the secure desktop, such as wallpaper or desktop icons. The security policies may also define the location of the temporary registry and temporary file system.

A secure layer of the secure desktop intercepts a call to the operating system (76). The operating system call may originate from an attendee remotely controlling the secure desktop from a remote attendee device 12. For example, the attendee may attempt to run an application such as the Control Panel application. The secure layer checks the operating system call against the security policies to determine whether to allow or block the operating system call (78). If the security policies do not allow the operating system call, then the secure layer blocks the operating system call (80). If the security policies allow the operating system call, then the secure layer redirects the call to the temporary registry or the temporary file system of the secure desktop, instead of sending the call to the working desktop's registry or file system (82). In this manner, a separate secure desktop is created that provides an isolated environment for a web conference meeting. The secure desktop thereby protects the integrity of the presenter's working desktop, while allowing documents, presentations, or other applications to be shared with attendees via the secure desktop.

Various embodiments of the invention have been described. These and other embodiments are within the scope of the following claims.

The invention claimed is:
1. A method comprising:
with a network meeting application executing on a presenter device, receiving a request for a network meeting at the presenter device having a working desktop as a first environment for executing applications on the presenter device;

with the network meeting application, automatically creating, in response to the request, a secure desktop on the presenter device separate from the working desktop as a second environment in which software applications can be launched by the presenter on the presenter device and execute on the presenter device during the network meeting;

with the network meeting application, presenting the secure desktop to a remote device via the network meeting;

with the network meeting application, allowing remote control of the secure desktop of the presenter device by the remote device; and with the network meeting application, blocking the remote device from accessing the working desktop of the presenter device.

2. The method of claim 1, further comprising:
intercepting an operating system call from a software application executing within the secure desktop; and
blocking the operating system call when security policies prevent the operating system call.

3. The method of claim 1, further comprising:
intercepting an operating system call from a software application executing within the secure desktop, wherein the operating system call requests access to a registry of the presenter device; and
redirecting the operating system call to a temporary registry associated with the secure desktop.

4. The method of claim 3, further comprising saving changes made to the temporary registry to the registry of the presenter device.

5. The method of claim 3, further comprising discarding changes made to the temporary registry.

6. The method of claim 2, further comprising:
intercepting an operating system call from a software application executing within the secure desktop, wherein the operating system call requests access to a file system of the presenter device; and
redirecting the operating system call to a temporary file system associated with the secure desktop.

7. The method of claim 6, further comprising saving changes made to the temporary file system to the file system of the presenter device.

8. The method of claim 6, further comprising discarding changes made to the temporary file system.

9. The method of claim 2, further comprising downloading the security policies to the presenter device from a server.

10. The method of claim 1, further comprising switching between the working desktop and the secure desktop using a secure icon.

11. The method of claim 1, further comprising setting security policies that restrict applications to be executed on the secure desktop.

12. The method of claim 11, wherein setting security policies comprises defining a location of a temporary registry and a temporary file system.

13. The method of claim 11, wherein setting security policies comprises defining desktop icons and wallpaper for the secure desktop.

14. A device comprising:
a network meeting application executing within a working desktop that provides a first environment for executing applications on a presenter device, wherein the network meeting application receives a request for a network meeting; and
a secure desktop, separate from the working desktop, automatically created by the network meeting application in response to the request as a second environment in which software applications can be launched by the presenter on the presenter device and execute on the presenter device during the network meeting,
wherein the network meeting application presents the secure desktop to a remote device via the network meeting, allows remote control of the secure desktop of the presenter device by the remote device, and blocks the remote device from accessing the working desktop of the presenter device.

15. The device of claim 14, wherein the secure desktop comprises:
a secure layer that intercepts an operating system call from a software application executing within the secure desktop, wherein the secure layer blocks the operating system call when security policies prevent the operating system calls.

16. The device of claim 14, wherein the secure desktop comprises:
a temporary registry,
wherein the secure layer intercepts an operating system call from a software application executing within the secure desktop, wherein the operating system call requests access to a registry of the presenter device, and
wherein the secure layer redirects the operating system call to the temporary registry.

17. The device of claim 16, wherein the secure layer saves changes made to the temporary registry to the registry of the presenter device.

18. The device of claim 16, wherein the secure layer discards changes made to the temporary registry.

19. The device of claim 14, wherein the secure desktop comprises:
a temporary file system,
wherein the secure layer intercepts an operating system call from a software application executing within the secure desktop, wherein the operating system call requests access to a file system of the presenter device, and
wherein the secure layer redirects the operating system call to the temporary file system.

20. The device of claim 19, wherein the secure layer saves changes made to the temporary file system to the file system of the presenter device.

21. The device of claim 19, wherein the secure layer discards changes made to the temporary file system.

22. The device of claim 14, wherein the network meeting application downloads security policies from a server for creating the secure desktop.

23. The device of claim 14, further comprising a secure icon for switching between the working desktop and the secure desktop.

24. The device of claim 14, wherein the security policies define a location of the temporary registry and a location of the temporary file system.

25. The device of claim 14, wherein the security policies define desktop icons and wallpaper for the secure desktop.

26. The device of claim 14, wherein the secure desktop has different wallpaper from the working desktop.

27. A system comprising:
a presenter device associated with a virtual private network (VPN) server, wherein a network meeting application executes within a working desktop of the presenter device, wherein the working desktop provides a first environment for launching and executing applications on the presenter device; and one or more attendee devices associated with the VPN server, wherein at least one of the attendee devices requests a network meeting from the presenter device, wherein, in response to the request, the presenter device automatically creates a secure desktop separate from the working desktop using the network meeting application as a second environment in which software applications can be launched by the presenter on the presenter device and execute on the presenter device during the network meeting, and wherein the network meeting application presents the secure desktop to the one or more attendee devices via the network meeting, allows remote control of the secure desktop of the presenter device by the remote device, and blocks the remote device from accessing the working desktop of the presenter device.

28. The system of claim 27, wherein the presenter device downloads security policies from a server for creating the secure desktop.

29. The system of claim 27, wherein the secure desktop comprises a secure layer that intercepts operating system calls, wherein the secure layer checks the operating system calls against stored security policies.

30. The system of claim 27, wherein the secure desktop comprises:

a temporary registry, wherein the secure layer intercepts an operating system call from a software application executing within the secure desktop, wherein the operating system call requests access to a registry of the presenter device, and wherein the secure layer redirects the operating system call to the temporary registry.

31. The system of claim 27, wherein the secure desktop comprises:

a temporary file system, wherein the secure layer intercepts an operating system call from a software application executing within the secure desktop, wherein the operating system call requests access to a file system of the presenter device, and wherein the secure layer redirects the operating system call to the temporary file system.

32. A non-transitory computer-readable medium comprising instructions for causing a presenter device to:

with a network meeting application executing on the presenter device, receive a request for a network meeting at the presenter device having a working desktop as a first environment for executing applications on the presenter device;

with the network meeting application, automatically create, in response to the request, a secure desktop on the presenter device separate from the working desktop as a second environment in which software applications can be launched by the presenter on the presenter device and execute on the presenter device during the network meeting;

present, with the network meeting application, the secure desktop to a remote device via the network meeting;

with the network meeting application, allow remote control of the secure desktop of the presenter device by the remote device; and with the network meeting application, block the remote device from accessing the working desktop of the presenter device.

33. The method of claim 1, further comprising:

executing a first software application within the working desktop of the presenter device; and launching a second software application within the secure desktop of the presenter device while the first software application is executing within the working desktop.

\* \* \* \* \*